Sept. 8, 1964     K. T. WILLIAMS ETAL     3,148,093
HEAT TREATING METHOD AND APPARATUS FOR
ELONGATED WORKPIECES Filed Dec. 7, 1960     2 Sheets-Sheet 1

WITNESSES

INVENTORS
Kenneth T. Williams &
John M. Edwards
BY
PATENT AGENT

United States Patent Office

3,148,093
Patented Sept. 8, 1964

3,148,093
HEAT TREATING METHOD AND APPARATUS FOR ELONGATED WORKPIECES
Kenneth T. Williams, Riviera Beach, and John M. Edwards, Towson, Md., assignors to Westinghouse Electric Corporation, East Pittsburgh, Pa., a corporation of Pennsylvania
Filed Dec. 7, 1960, Ser. No. 74,389
8 Claims. (Cl. 148—131)

The present invention relates to a heat treating method and apparatus, and more particularly to a method and apparatus for heat treating elongated workpieces such as structural steel members.

In the scansion heat treating of structural steel members, such as I-beams, channel members, angles, etc., by raising the temperature of same to about 1800° F. followed by a quench to 300° F., as in hardening, a non-uniformity of temperature in the treated zone or zones of the workpiece member during heating or/and quenching tends to cause the member to become warped or bent, requiring cold straightening for correction of the warpage.

Heretofore in the heat treatment of structural steel members for hardening, for example, the practice has been to heat such members in furnaces or with high velocity gas burners to the hardening temperature, followed by a water spray quench, which results in the distortion of the member as aforediscussed. The members, following a stress-relieve heating-and-cooling procedure, which tends to cause more distortion, are then straightened as by an expensive and massive roller straightener.

In view of the foregoing remarks, it becomes a prime object of the present invention to provide a method and apparatus for heat treating structural steel members whereby the straightening operation following the quench becomes unnecessary.

It becomes another object of the present invention to provide a method and apparatus for heat treating structural steel members, including heating and quenching, whereby such members are undistorted upon leaving the quench.

In accord with the preceding objects, a further object of the invention resides in the provision of a method and apparatus for the heat treating of structural steel members in an expeditious manner.

Other objects and advantages of the invention will become apparent from the following detailed description when taken in connection with the accompanying drawings in which.

*Description*

Figure 1:
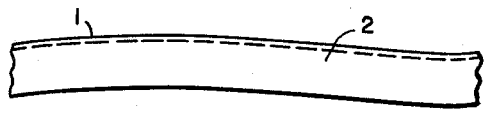
FIGURE 1 is a showing of a structural steel channel member illustrating with exaggeration an exemplified manner in which such intendedly-straight member tends to become distorted during heat treatment in the conventional manner.
Figure 3:
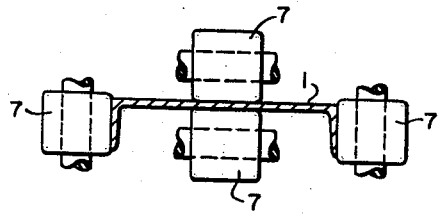
FIG. 3 is a section view taken along the line 3—3 in FIG. 2, with certain components deleted from the showing for clarification; and, FIG. 4 is a schematic showing of an alternate or auxiliary apparatus for performing or assisting in the performance of the novel method of the present invention.

Referring to FIG. 1, distortion or warping of a structural steel member 1 may occur as shown exaggeratedly during heat treatment in the conventional manner due to different rates of heating and cooling which may result from such as the varied cross-sectional dimensions of the member, non-uniform application of heat and quench, etc. Such distortion will tend to be uniform with respect to the length of the member, assuming a constant rate of scansion of a constant heat source and quench. Other distortions which are non-uniformly distributed may occur in the workpiece member as a result of relief of stresses which may have been frozen-in during cold-straightening operations preceding the heat treating process. This latter type of distortion is indicated at portion 2 of the member 1 illustrated in FIG. 1.

In accord with the novel heat treating method of the present invention, such method includes, in addition to the step of effecting at a work station the scanning of the workpiece member by a heat source 4, preferably an induction heating coil or inductor (FIG. 2) and the subsequent step of quenching the workpiece member 1, as by a quench source 5, preferably a water spray; the step of effecting a compensating deflection or steering of the workpiece member 1 to offset the distorting tendencies which arise during the heat treatment.

Figure 2:
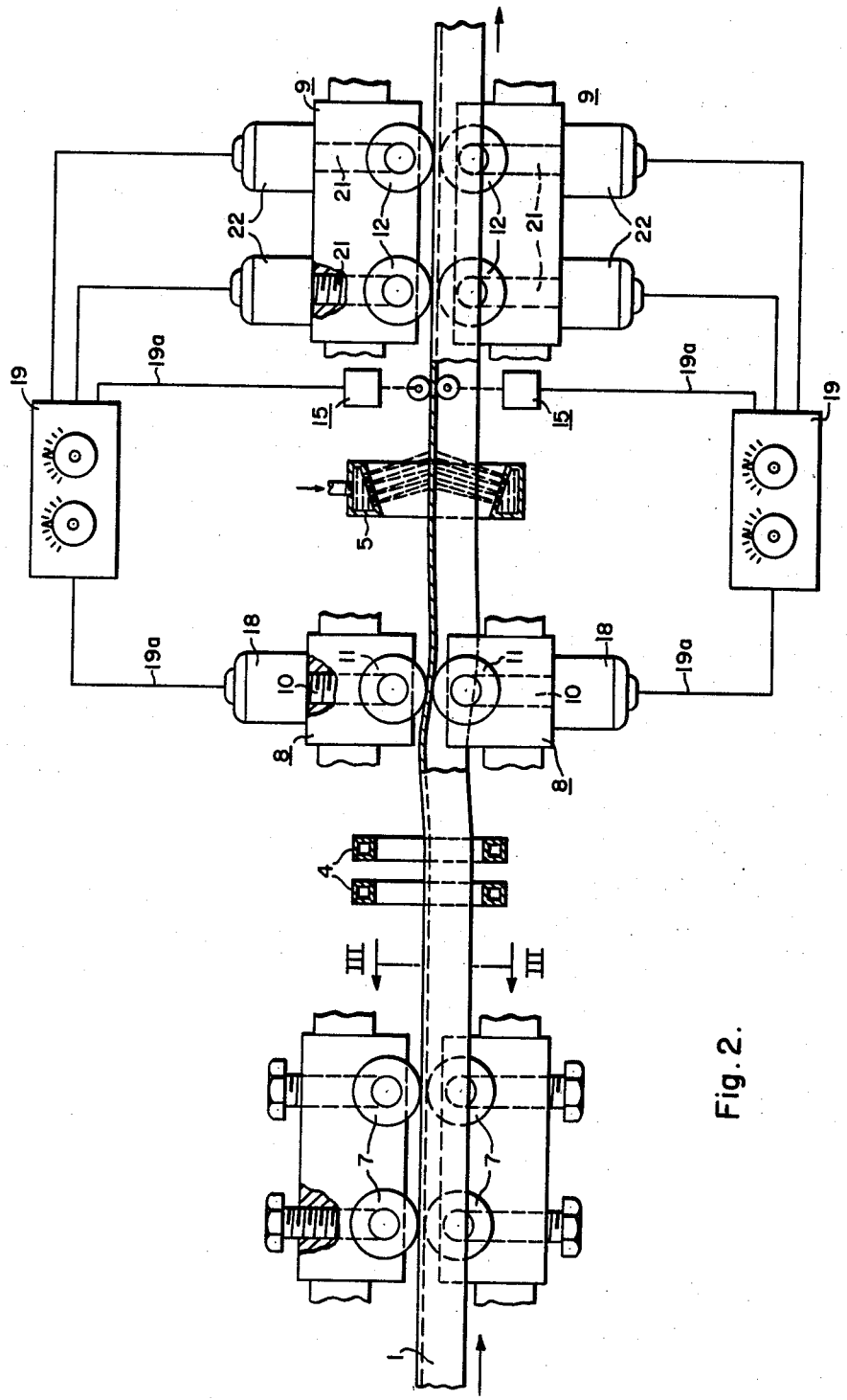
FIG. 2 is a schematic showing, partly in outline and partly in section, of one form of apparatus for performing the heat treating method of the invention.

The preferred manner of introducing the distortion-compensating step may be arrived at by utilization of the apparatus shown in FIG. 2 where the workpiece member 1, in the form of a channel member, for example, is introduced to the heat source 4 at the work station by entrance guide rollers 7 and deflected, bent or steered while at the heat treatment temperature at exit of the heat source 4 by distortion-compensation roll means 8 prior to introduction to the quench source 5. Following exit from the quench source 5, the workpiece member 1 will exit the heat treating apparatus via an assemblage of constraint roll means 9 which constitutes an adjunct to the distortion-compensation roll means 8.

In operation of the apparatus of FIG. 1, the roll means 8 may be adjusted as by screwdown means 10 to so align rolls 11 relative to rolls 7 and 12 that the compensation deflecting, bending or steering of the member 1, indicated exaggeratedly at 13, necessary for emergence of such member from assemblage 9 as a straight channel member is effected.

Such screw-down aligning adjustment of the roll means 8 may remain effective for prolonged periods of time embracing the heat treatment of a number of workpieces when the warping tendency of the heat source and/or quench source remains constant and no random locked-in cold-straightening stresses appear in the workpiece members being introduced to the apparatus for heat treatment. Where, however, it is desired to facilitate screw-down adjustment of the distortion-compensation roll means 8 or to enable the handling of workpiece members having random frozen-in straightening stresses, or to compensate for mechanical tolerance variation, for example, the heat treating method of the invention includes the step of sensing the tendency of the beam to be deflected following the quenching step, i.e. sensing an error in the intended shape of the workpiece following its being heated and quenched, and automatically controlling the screw-down adjustment of the roll means 8 according to the sensed information. This may be accomplished by provision of a distortion sensor means 15 of any suitable form, located at the exit of the quench means 5 to provide an error signal which is fed to suitable transducer means 18 operatively connected to the screw-down means 10 via such as a feedback control means 19 and signal conductors 19a.

It is conceivable that it may be preferable to provide for adjustment of the roll means 9, either as assist to the bending, deflecting or steering function of the roll means 8, or as a substitute agent for performing the same function, in cooperation with the entrance guide rollers 7, for example. For this reason, the roll means 9 is shown in FIG. 2 as being adjustable and provided with screw-down means 21 for the rollers 12, and with transducer means 22 controlled by the deflection sensor means 15 via the feedback control means 18 in the same manner as the roll means 8.

Since in the heat treatment of structural steel members for hardening, for example, the member 1 will be heated by heat source 4 up to approximately 1800° F., it will be appreciated that by effecting the compensation in the heated region of the workpiece member, relatively small forces and energy are required as compared to that requisite to cold straightening. For example, while at 1800° F. the structural steel member will have a strength of 5000 p.s.i., while the quenched hardened portion of such member will have a corresponding strength of approximately 200,000 p.s.i. at room temperature.

Figure 4:
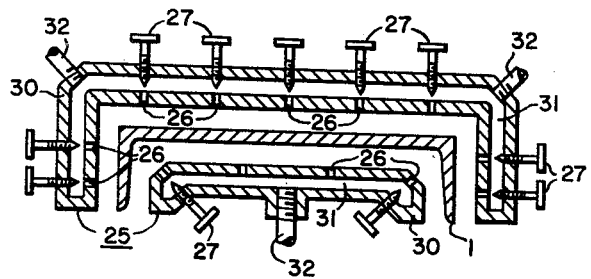

As a further alternate to the effecting of the compensation-deforming step, reference may be made to FIG. 4 showing a quench means 25 which is adjustable to control the distribution of the quenching medium or fluid transversely of the workpiece member 1 to thereby effect a compensating deformation of such member and thus assure its straightness following exit therefrom. In treating the exemplified U-shaped channel, for example, with equal quench distribution, the flat portion may tend to expand relative to the side legs and to produce bending. Under these circumstances, in accord with the present invention, the flow of quench supplied to the flat portion is adjusted relative to the flow supplied to the side legs to obtain the desired straightness of such heat treated member.

Such adjustable quench means 25, for sake of illustration, will comprise a plurality of nozzles or orifices 26 distributed about the surfaces of the workpiece member 1 and adapted to be selectively adjustable for flow regulation by such as respective needle valve means 27, which may be manually adjusted or automated, as in the case of the roll means 8, according to desire or necessity. Although a plurality of nozzles in a common casing 30 is illustrated, it may be preferable to provide separate nozzle devices. Common header conduits 31 and fluid source pipes 32 for the several nozzles are also shown.

While the invention has been described with reference to certain embodiments and illustrations with a degree of particularity, it is intended that such invention be not necessarily so limited except as embraced within the scope of the appended claims.

We claim as our invention:

1. Apparatus for the continuous low-distortion heat treatment of an elongated workpiece, comprising heat and quench sources for respectively through-heating and cooling a longitudinal zone of said workpiece, means for effecting successive scanning of said workpiece longitudinally within said heat and quench sources, adjustable means for applying forces transversely to the workpiece for bending same at said zone and between said sources to compensate for a tendency to warpage, and means for sensing said tendency and controlling said adjustable means to automatically maintain the intended shape of said workpiece during its heat treatment.

2. A method for the continuous heat treatment of an elongated workpiece while preventing distortion of same, comprising the steps of effecting successive scanning of said workpiece longitudinally within heat and quench sources, and applying forces transversely to such workpiece during such scanning for bending said workpiece at a through-heated zone between said sources to compensate for any tendency to become warped during its heat treatment.

3. Apparatus for the low-distortion heat treatment of an elongated workpiece, comprising spaced-apart heat and quench sources, means for effecting successive scanning of said workpiece longitudinally by said heat and quench sources whereby a through-heated zone passes longitudinally along said workpiece, and means for bending said workpiece between said sources within said heated zone by application of forces transversely to said workpiece to compensate for any tendency to become distorted during such heat treatment.

4. A method for the low-distortion heat treatment of an elongated workpiece, comprising the steps of effecting successive spaced-apart scanning of said workpiece longitudinally by heat and quench sources whereby a through-heated zone passes along said workpiece, and bending said workpiece between said sources at said heated zone by application of forces transversely of said workpiece to compensate for tendency of such workpiece to become distorted and thereby maintain the integrity of its intended shape.

5. Apparatus for the low-distortion heat treatment of an elongated workpiece, comprising heat and quench source means, means for effecting successive scanning of said workpiece by said heat and quench sources, and roll means for applying forces transversely to said workpiece to effect bending of said workpiece at its through-heated zone between said sources to compensate for distortion and assure integrity of workpiece shape.

6. A method for the low-distortion heat treatment of an elongated workpiece, comprising the steps of effecting successive scanning of said workpiece longitudinally by heat and quench sources whereby a through-heated zone passes along said workpiece, and applying external transversely-directed bending forces to said workpiece during such scanning to bend said workpiece at said zone between said sources to compensate for distortion and assure integrity of shape.

7. Apparatus for the low-distortion heat treatment of an elongated workpiece, comprising heat and quench source means for respectively through-heating and cooling a longitudinal zone of said workpiece, means for effecting successive longitudinal movement of said workpiece within said heat and quench sources, roll means for applying forces transversely to said workpiece to effect bending of said workpiece at its through-heated zone between said sources to compensate for distortion and assure integrity of workpiece shape, and means for sensing the tendency of said workpiece to be distorted and automatically controlling said roll means accordingly.

8. A method for the low-distortion heat treatment of an elongated workpiece, comprising the steps of effecting successive scanning of said workpiece longitudinally within heat and quench sources whereby a through-heated zone passes along said workpiece, applying external transversely-directed bending forces to said workpiece to bend same at said zone between said sources during such scanning to compensate for distortion and assure integrity of shape, sensing during said scanning the degree of tendency for distortion of the workpiece, and automatically controlling during said scanning the magnitude of said bending forces according to the sensed distortion-tendency information.

References Cited in the file of this patent

UNITED STATES PATENTS

| | | |
|---|---|---|
| 2,246,840 | Crane et al. | June 24, 1941 |
| 2,570,883 | Stivin | Oct. 9, 1951 |
| 2,783,788 | Ungerer | Mar. 5, 1957 |
| 2,806,412 | Gurley et al. | Sept. 17, 1957 |
| 2,890,975 | Lenz | June 16, 1959 |